United States Patent
Hein, III et al.

(10) Patent No.: US 8,594,364 B2
(45) Date of Patent: Nov. 26, 2013

(54) BATCH IDENTIFIER REGISTRATION AND EMBEDDING IN MEDIA SIGNALS

(75) Inventors: William C. Hein, III, Glenmoore, PA (US); Tyler J. McKinley, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 1753 days.

(21) Appl. No.: 11/371,374

(22) Filed: Mar. 7, 2006

(65) Prior Publication Data

US 2007/0070429 A1    Mar. 29, 2007

Related U.S. Application Data

(63) Continuation-in-part of application No. 10/053,488, filed on Nov. 2, 2001, which is a continuation-in-part of application No. 09/706,505, filed on Nov. 2, 2000, now abandoned.

(51) Int. Cl.
  *G06K 9/00* (2006.01)
(52) U.S. Cl.
  USPC ............................................ 382/100
(58) Field of Classification Search
  USPC ............................................ 382/100
  See application file for complete search history.

(56) References Cited

U.S. PATENT DOCUMENTS

| | | | |
|---|---|---|---|
| 3,845,391 A | 10/1974 | Crosby | |
| 4,780,599 A | 10/1988 | Baus | |
| 4,994,987 A | 2/1991 | Baldwin | |
| 5,337,361 A | 8/1994 | Wang et al. | |
| 5,606,609 A | 2/1997 | Houser et al. | |
| 5,627,967 A | 5/1997 | Dauerer et al. | |
| 5,640,193 A | 6/1997 | Wellner | |
| 5,765,176 A | 6/1998 | Bloomberg | |
| 5,841,886 A | 11/1998 | Rhoads | |
| 5,905,800 A | 5/1999 | Moskowitz et al. | |
| 6,024,287 A * | 2/2000 | Takai et al. | 235/493 |
| 6,119,944 A | 9/2000 | Mulla | |

(Continued)

FOREIGN PATENT DOCUMENTS

| EP | 936531 A2 * | 8/1999 |
|---|---|---|
| EP | 1223742 | 7/2002 |

(Continued)

OTHER PUBLICATIONS

Digimarc Press Release, "New Standalone Embedding Tool Simplifies and Automates Digimarc Embedding Process for Web Publishing," Aug. 4, 1998.

(Continued)

*Primary Examiner* — Wenpeng Chen

(57) ABSTRACT

An automated batch identifier registration and embedding system for media signals, such as image, video and audio files. A batch identifier registration system enables a user to submit a request for a batch of unique identifiers to be embedded in media signals. The user submits a request for a batch of IDs. The batch registration system verifies the accuracy of the request, sends a confirmation, allocates IDs, creates corresponding entries in a registration database, and creates embedder files used in a batch embedding process. The user may then submit a request for embedder files. To perform automated batch embedding, a watermark embedder takes the embedder files and corresponding list of media signal files as input and automatically embeds identifiers supplied in the embedder files into corresponding media signal files.

20 Claims, 2 Drawing Sheets

(56) References Cited

U.S. PATENT DOCUMENTS

| | | |
|---|---|---|
| 6,122,403 A | 9/2000 | Rhoads |
| 6,125,388 A | 9/2000 | Reisman |
| 6,135,646 A | 10/2000 | Kahn et al. |
| 6,148,331 A | 11/2000 | Parry |
| 6,243,480 B1 | 6/2001 | Zhao et al. |
| 6,249,226 B1 | 6/2001 | Harrison et al. |
| 6,249,870 B1 | 6/2001 | Kobayashi et al. |
| 6,311,214 B1 | 10/2001 | Rhoads |
| 6,314,457 B1 | 11/2001 | Schena et al. |
| 6,353,929 B1 | 3/2002 | Houston |
| 6,377,946 B1 * | 4/2002 | Okamoto et al. ............ 707/5 |
| 6,421,450 B2 | 7/2002 | Nakano |
| 6,434,561 B1 | 8/2002 | Durst, Jr. et al. |
| 6,466,329 B1 | 10/2002 | Mukai |
| 6,526,449 B1 | 2/2003 | Philyaw et al. |
| 6,542,933 B1 | 4/2003 | Durst, Jr. et al. |
| 6,611,830 B2 | 8/2003 | Shinoda et al. |
| 6,679,420 B1 | 1/2004 | Lapstun et al. |
| 6,701,369 B1 | 3/2004 | Philyaw |
| 6,738,495 B2 | 5/2004 | Rhoads et al. |
| 6,947,571 B1 * | 9/2005 | Rhoads et al. ............ 382/100 |
| 7,003,731 B1 * | 2/2006 | Rhoads et al. ............ 715/768 |
| 7,206,820 B1 * | 4/2007 | Rhoads et al. ............ 709/217 |
| 8,180,844 B1 * | 5/2012 | Rhoads et al. ............ 709/217 |
| 2001/0001854 A1 | 5/2001 | Schena et al. |
| 2001/0017885 A1 | 8/2001 | Asai et al. |
| 2001/0021916 A1 | 9/2001 | Takai |
| 2001/0021978 A1 | 9/2001 | Okayasu et al. |
| 2001/0044824 A1 | 11/2001 | Hunter et al. |
| 2001/0044899 A1 * | 11/2001 | Levy ............ 713/176 |
| 2001/0047428 A1 | 11/2001 | Hunter et al. |
| 2001/0047515 A1 | 11/2001 | Schreer |
| 2001/0048025 A1 | 12/2001 | Shinn |
| 2001/0051996 A1 | 12/2001 | Cooper et al. |
| 2001/0054150 A1 | 12/2001 | Levy |
| 2001/0055391 A1 | 12/2001 | Jacobs |
| 2002/0012443 A1 * | 1/2002 | Rhoads et al. ............ 382/100 |
| 2002/0023148 A1 | 2/2002 | Ritz et al. |
| 2002/0032698 A1 | 3/2002 | Cox |
| 2002/0033844 A1 | 3/2002 | Levy et al. |
| 2002/0059162 A1 | 5/2002 | Shinoda et al. |
| 2002/0059238 A1 | 5/2002 | Saito |
| 2002/0062382 A1 | 5/2002 | Rhoads et al. |
| 2002/0075298 A1 | 6/2002 | Schena et al. |
| 2002/0080396 A1 | 6/2002 | Silverbrook et al. |
| 2002/0091575 A1 | 7/2002 | Collart |
| 2002/0111912 A1 | 8/2002 | Hunter et al. |
| 2002/0122568 A1 | 9/2002 | Zhao |
| 2003/0002710 A1 | 1/2003 | Rhoads |
| 2008/0140714 A1 * | 6/2008 | Rhoads et al. ............ 707/104.1 |

FOREIGN PATENT DOCUMENTS

| | | |
|---|---|---|
| WO | WO0115021 | 3/2001 |
| WO | WO0171517 | 9/2001 |
| WO | WO0173586 | 10/2001 |

OTHER PUBLICATIONS

Digimarc Watermarking Guide, iv+18pp., 1999.

* cited by examiner

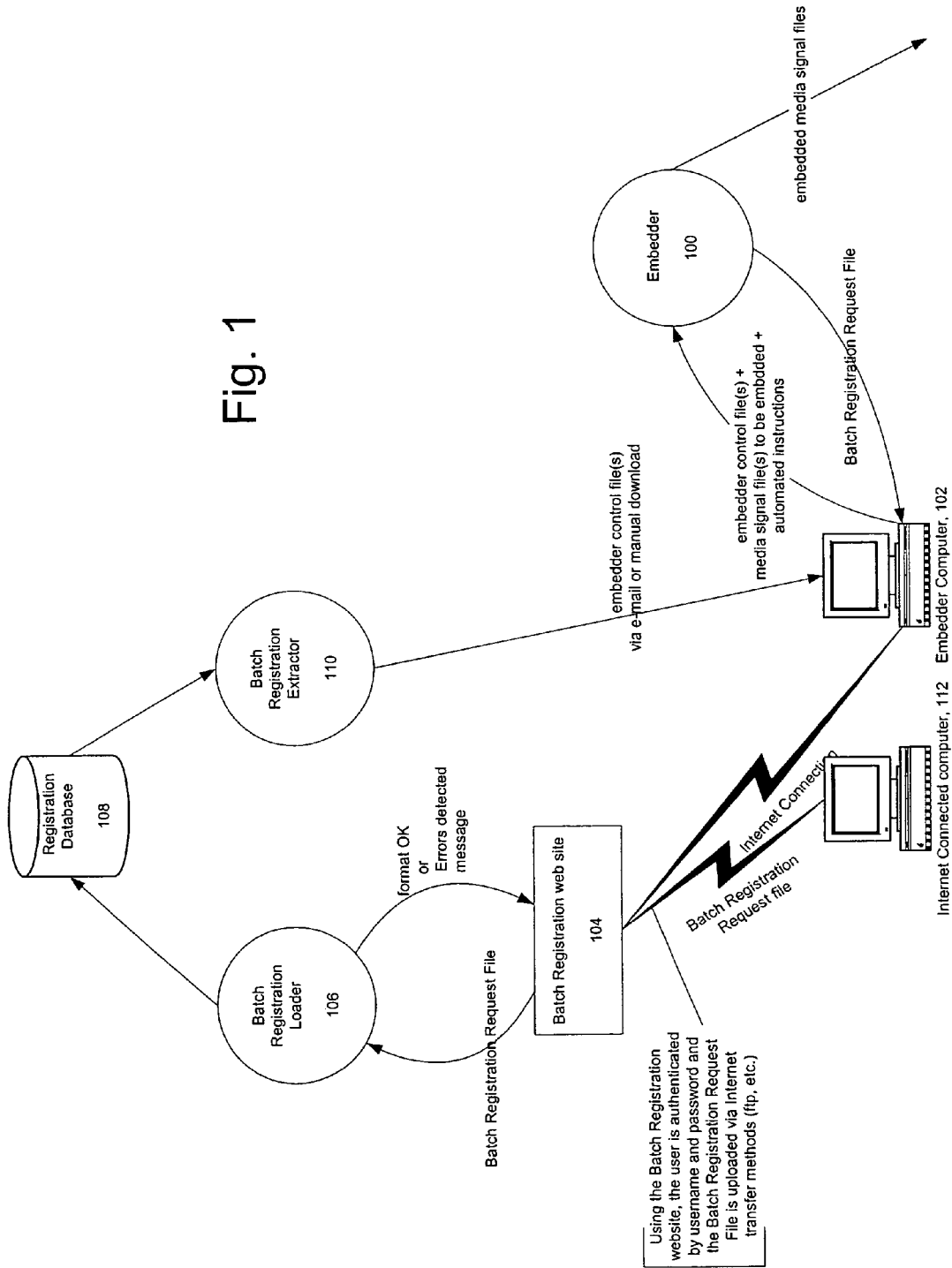

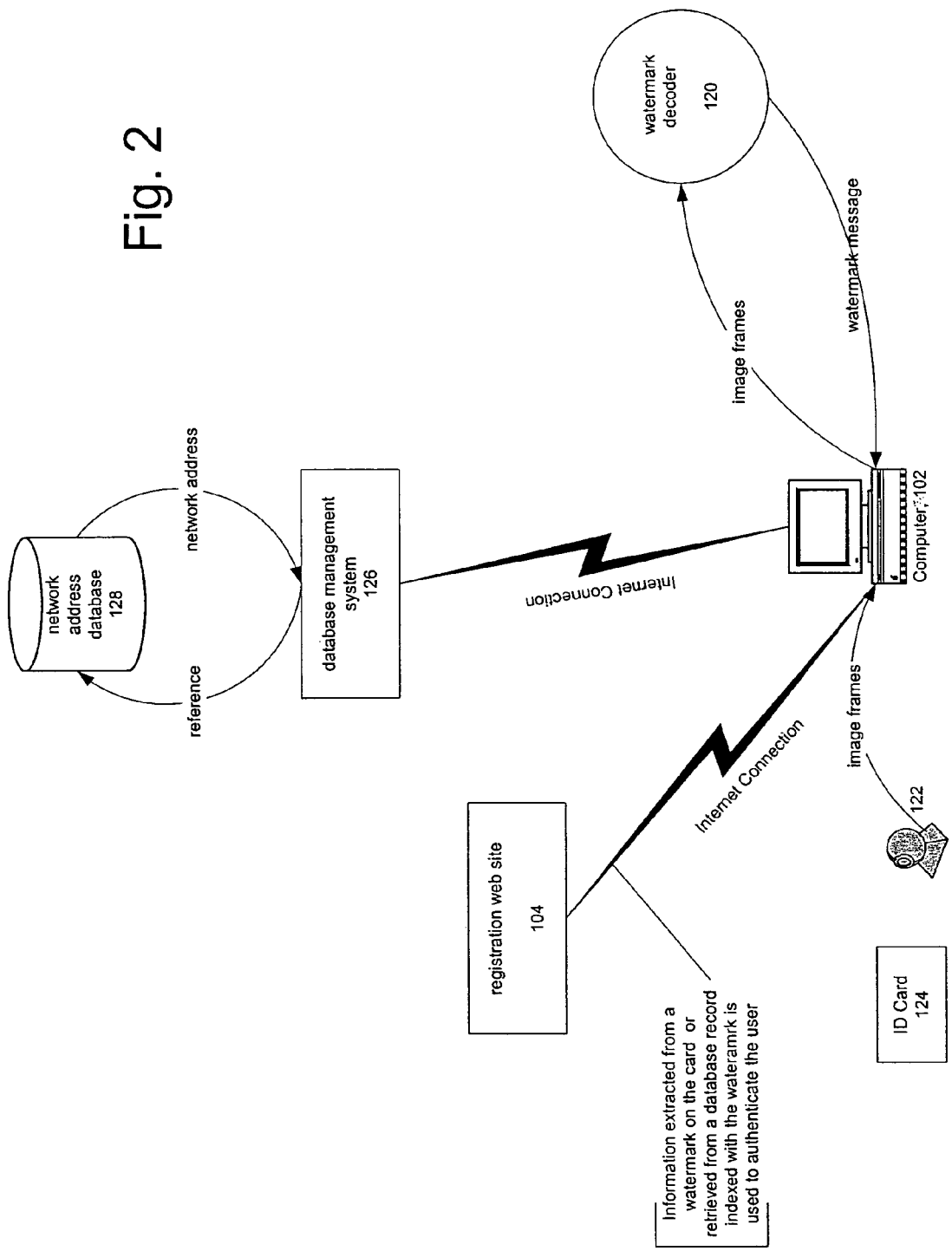

BATCH IDENTIFIER REGISTRATION AND EMBEDDING IN MEDIA SIGNALS

RELATED APPLICATION DATA

This application is a continuation-in-part of copending application Ser. No. 10/053,488, filed Nov. 2, 2001, which is a continuation-in-part of application Ser. No. 09/706,505, filed Nov. 2, 2000. The present specification is substantially identical to that of application Ser. No. 09/706,505.

The subject matter of the present application is related to that disclosed in U.S. Pat. Nos. 5,862,260, 6,614,914, and 6,947,571 (the latter of which claims priority to U.S. Provisional Application No. 60/134,782, filed May 19, 1999).

TECHNICAL FIELD

The invention relates to multimedia signal processing, and in particular relates to encoding information into media signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 5,862,260 and 6,614,914, which are hereby incorporated by reference.

Some applications require that a vast number of media signals (e.g., images, video or audio files) each be encoded with unique watermark identifiers. Examples of applications include embedding an identifier in media signals to link them to a network resource for metadata linking (e.g., linking content to a unique web site), for forensic tracking of digitally distributed content, for broadcast monitoring, etc. In such applications, there may be several customers, each requiring large batches of identifiers (IDs). As such, there is a need for an accurate and efficient way of assigning IDs.

Such applications can also create a bottleneck in the content creation and distribution workflow due to the processing resources and time needed to embed unique identifiers into many media signals. There is a need, therefore, for automated processes for facilitating batch embedding of identifiers into media content.

The invention provides methods and systems for batch identifier registration and embedding into media content. While particularly adapted to digital watermark embedding, these methods and systems may be applicable to other forms of encoding identifiers and other metadata in large batches of media files.

Further features will become apparent with reference to the following detailed description and accompanying drawings.

BRIEF DESCRIPTION OF THE DRAWINGS

FIG. 1 is a system diagram of a batch identifier registration and watermark embedding system.

FIG. 2 is a system diagram showing how the user authentication process employed in FIG. 1 can be enhanced using watermarked identity cards.

DETAILED DESCRIPTION

FIG. 1 is a system diagram of a batch identifier registration and watermark embedding system. In this system, a batch identifier registration system enables a user to submit a request for a batch of unique identifiers to be embedded in media signals. The user submits a request for a batch of IDs. The batch registration system verifies the accuracy of the request, sends a confirmation, allocates IDs, creates corresponding entries in a registration database, and creates embedder files used in a batch embedding process. The user may then submit a request for embedder files. To perform automated batch embedding, a watermark embedder takes the embedder files and corresponding list of media signal files as input and automatically embeds identifiers supplied in the embedder files into corresponding media signal files. The media signal files may be files including audio, video or still image signals to be embedded with a watermark. A more detailed description follows with reference to FIG. 1.

The process begins when the party wishing to embed multiple watermarks into multiple objects logs on to the batch registration web site 104 using client software executing on a computer (102, 112) connected to the Internet. This client may include, but is not limited to, the embedder computer 102, which provides a means for connecting to the Internet and initiating the log on to the batch registration web site from within the embedder 100 software, or other client software, such as an Internet browser, from another computer 112. Both methods provide the user with a user interface and a template that can be completed to create a valid batch registration request file.

This batch registration file includes either a request to reserve a specific number of watermark identifiers for later embedding or specific information, including a description of the behavior to be associated with the identifiers. One example of the behavior is linking a watermark decoding device to a web site or other network resource associated with a watermark identifier. In this case, the behavior description may include a network address (e.g., IP address, URL of a web site, etc.).

Another example of a behavior is returning related information to the decoding computer, such as a document (HTML document), software program, streaming or file downloading of audio, video, or images. In this case, the behavior description may include the information to be returned, or a reference to the information to be returned, along with instructions for controlling the transfer of the information to the decoding computer. The behavior may also specify that the related information is to be transferred to some device other than the device that decodes the watermark identifier.

Another example of a behavior is launching an email program to send an email to a specified recipient. In this case, the behavior description may include an email address of the intended recipient of the email. The email software presents a user interface to the user of the decoding computer showing an email editing window with an email message including the recipient's email address. This email software may execute on a server and present a web interface to the client, or may run on the client in response to an instruction from the database that maps the identifier to the behavior.

If the batch registration file is being submitted to reserve watermark identifiers only, a subsequent batch registration file with the behavior description, including a behavior and assigned watermark identifier, is submitted to enable the system to associate the behavior with the identifier. In place of the subsequent batch registration file, the user may log into the existing watermark registration website and add the required behavior information, one watermark ID at a time.

The registration system places the identifiers and corresponding behavior descriptions in a database. To initiate a behavior associated with a watermark identifier, a watermark decoding device extracts the identifier from a watermarked media object, sends it to the database. In turn, the database looks up the corresponding behavior description and initiates the behavior or behaviors associated with the identifier. This may include, for example, returning a network address for web linking to the watermark decoding device or a web server. In the former case, the decoding device uses the address to establish a connection with the resource at the address and fetch information or launch a program (such as downloading a media object) at that specified address. In the latter case, the web server forwards information, such as an HTML document, streaming media, etc. to the decoding device.

The batch registration web site provides a web interface, implemented in HTML. This interface may also be implemented in HTML, SHTML, ASP or using other web development methods. The client software and batch registration web site using Internet communication protocols such as HTTP, HTTPS, XML, and TCP/IP.

The user enters his username and password via a web-based user interface displayed on the PC 102 (or 112) and submits them to the web site for authentication.

Upon authentication, the batch registration website 104 presents the user with a user interface screen that allows the user to locate his or her batch registration request file for uploading to the web site. The user then enters a command to upload the selected request file.

The user provides the information required to locate the file on the user's computer for upload.

The batch registration request file is uploaded into a batch registration loader 106.

The batch registration loader 106 performs a quick scan of the uploaded batch registration request file and reports back to the user any errors in format that it detects. If there are errors, the file is not processed. The loader adds the behavior description and corresponding identifier to a registration database used to process queries from watermark decoding devices.

If the batch registration request file is properly formatted, the embedder receives a confirmation from the batch registration website 104 that the request file has been successfully uploaded and will be submitted for processing by the batch registration loader 106.

The user may now either submit a new batch registration request file or logoff of the batch registration web site 104.

The batch registration loader 106 uses the information contained in the user's uploaded batch registration request file to automatically allocate (register) watermark identifiers in a registration database 108. The identifiers are in the form of unique serial numbers. Once this process is completed, the batch registration loader 106 initiates a request to the batch registration extractor 110 for these new registration entries.

Upon receipt of a request, the batch registration extractor 110 accesses the registration database 108 and creates one or more embedder control file(s) for each of these new registered watermark serial numbers. The embedder control file includes a watermark serial number, name of the file to be embedded, and embedder control instructions. In one implementation, there is a separate embedder control file for each corresponding media signal file to be embedded with a watermark. In an alternative implementation, there is a single file per batch embedding process. This file includes a watermark serial number for each media signal file to be embedded in the batch process, an identifier of the corresponding media signal files, and instructions for embedding the serial numbers into the corresponding media signal files.

Upon completion of this process, the batch registration extractor process sends the embedder control file(s) back to the user via Internet e-mail. Optionally the embedder control file(s) may remain on the batch registration extractor system and will be downloaded to the user, at their discretion, by logging back into the batch registration web site and requesting a manual download of these files.

Once the user/embedder has received the embedder control file(s), it uses these file(s), along with the host media signal file(s) and a set of embedding instructions to the embedder software 100 to instruct the embedder software to automatically embed the list of watermark serial numbers included in the embedder control file(s) into the listed media signal files, producing a set of watermark-embedded media signal files.

As alternative to embedding on the user's computer, the batch registration system may supply the embedder control files to a different, perhaps Internet server-based embedder computer. One advantage of this approach is to perform embedding of large batches on a more powerful computer or array of computers. In particular, a computer with multiple processors or an array of computers can embed watermark messages into corresponding media signal files in parallel processes. For large media signal files, or files that will be embedded with multiple, and potentially different watermark messages, parallel embedding processes can embed these watermark messages into different parts of a media signal a single file in parallel. For example, a still image typically is divided into contiguous blocks of pixels, each carrying a watermark message. Similarly, temporal or spatial regions of a sequence of video frames can be subdivided and embedded with the same or different watermark messages. In video, for instance, one sequence of frames may be linked to a first web site relating to the content in that sequence, while another sequence may be linked to a second web site relating to the content in that sequence. A similar approach may be applied to segments of a music file, or different music tracks in a file having the songs of a particular CD.

Of course, if the user/device supplying the media signal files for embedding and the embedder computer are in separate locations, the system needs to facilitate the transfer of media signal files from the user's device to the embedder computer and then back to the desired location, such as a content distributor, printer, publisher, CD or DVD manufacturing facility, streaming media server system, etc. The files may be transferred using Internet communication protocols like FTP. In addition, the embedder computer can be implemented within the same site of the registration computer system. The registration system computer may provide an address or pointer of the embedder control files and media signal files to the embedder computer, enabling it to fetch both and perform embedding operations one the media signals as specified in the embedder control files.

The embedder software 100 may be adapted for different media signal types. As noted, particular techniques for embedding and detecting imperceptible watermarks in media signals are detailed in the assignee's U.S. Pat. Nos. 5,862,260 and 6,614,914. Alternative watermark embedding technologies may be used as well. In an implementation for still images, the watermark message is repeatedly embedded in contiguous blocks of pixels of the still image. For print media applications, the watermark survives transformations associated with printing the watermarked image and later scanning the image as part of the process of capturing a digital image from which the watermark identifier is extracted.

In an implementation for audio signals, such as music files, the watermark message is repeatedly embedded in contiguous segments of the audio signal. The watermark is designed to survive transformations typical in the application, such as broadcast transformations, compression, digital to analog and analog to digital conversion, streaming delivery over a computer network, etc.

In an implementation for video signals, such as movie files, the watermark message is repeatedly embedded in temporal and spatial regions of the video signal. The watermark is designed to survive transformations typical in the application, such as broadcast transformations, compression, digital to analog and analog to digital conversion, streaming delivery over a computer network, etc.

In each case, the watermark message comprises a serial number and possibly additional information such as copy or rendering control commands, content type flags (like content rating flags for adult content), error detection codes, calibration or synchronization codes, etc. While the batch embedding application described above encodes serial numbers used to link the content with machine behaviors like web site linking, the system may be used to encode a variety of message information, including copy control information, alteration detection information used to detect signal alteration. In addition, the watermark message embedded throughout a media signal file may vary from one region or block of the file to the next.

In still images, audio and video, the embedder control file indicates the message or messages to be embedded. The embedder control file may also specify where to put each message, such as which pixel blocks for still images, which pixel blocks and frames for video, and which audio segments for an audio signal. In temporal signal content, like audio or video, the embedder control file acts as an Edit Decision List (EDL), which specifies the message and the time stamp indicating the start and end of the signal segment where the message is to be embedded. The EDL may also include the behavior to be associated with each message, such as a URL for linking a web site at the URL to a particular piece of content, HTML content with additional links that give the user of the watermark decoder the option to select a behavior to be activated at the time of watermark decoding, etc.

Authentication of Users of the Registration Database

The ID registration process described above implements user authentication through the use of a username/password log in scheme and augments that security through the use of "roles". "Roles" come into play to limit the ability of a subordinate organization, such as an Ad Agency or web site design firm, from accessing and/or updating watermark registration information input by a superior organization (in this example, the content publisher). For watermark enabled printed advertisements, a typical hierarchy of the "roles" would be—customer then Agency then pre-press.

As an additional measure, the registration system maintains an audit trail of each set of watermark information from creation through update to deletion.

The use of watermarked identity cards further enhances the security of the authentication process. FIG. 2 is a system diagram showing how the registration process can be enhanced using watermarked identity cards. In one authentication scheme, the controlling authority for the registration database issues identity cards to authorized users. The identity cards have a unique watermark embedded within an image on each card. In this scheme, the user uses this card to access the registration system (e.g., the registration web site 104) by using a watermark decoder 120 connected to an image capture device. In the system shown in FIG. 2, the watermark decoder is implemented in a software application program executing in the user's computer. This application program extracts watermark messages from image frames captured of watermarked images by a PC Camera 122 or other image capture device coupled to the computer via a wire or wireless connection (e.g., firewire, USB, Bluetooth, etc.).

When prompted for a username by the web site, the user shows the card 124 to the PC camera to "read" that watermark, carrying a message identifying attributes of the user (e.g., company name, etc.) attempting to log in. The watermark decoder 120 reads image frames from the PC camera 122, extracts the watermark message embedded in the frames and forwards it to the registration web site 104 via an Internet connection. For corporate users, a corporate-wide password may be used to keep the administration of the passwords as unobtrusive as possible.

While the card allows the user to log in as representing their company (and therefore is granted the "role" and rights of that company while accessing the registration functions), the registration system 104 tracks their log in and actions on an individual basis (the cards are all unique). This scheme requires users to present a valid "identity" card to an image capture device and enter a matching, valid corporate password to access the system.

A variant of the first scheme is to modify the registration log at the registration web site to use information directly in the registration database to authenticate the user. One such variant is described below:

1. The user shows the "identity" card 124 to the camera 122 using the watermark decoder program 120, which displays a window on the computer's monitor showing the image frames captured by the camera;

2. The watermark decoder program 120 links the user to the registration web site 104. In particular, the watermark on the identity card carries a watermark message including a URL or reference to a network address in a database. In the former case, the watermark decoder uses the URL to establish a connection with the registration web site 104. The decoder may pass the URL to an Internet browser to establish the connection or may establish the connection itself. In the latter case, the watermark decoder 120 sends the reference to the network address to a database management system 126, which looks up the corresponding network address in a database 128. In one implementation, the database management system executes on an Internet server at an IP address known to the watermark decoder. The watermark decoder establishes an Internet connection with the DBMS 126 and forwards the reference extracted from the watermark message, optionally with other information from the watermark or user. The DBMS uses the reference to look up a corresponding network address (URL or IP address) of the registration website. It then either returns the network address of the registration web site to the watermark decoder or routes an HTTP request to the registration web site along with the user's IP address, which in turn, forwards a registration web page to the user's computer using the IP address of the user's computer. In the case where the DBMS returns the network address to the user's computer for re-direction, the decoder program uses the address to establish an Internet connection with the registration web site.

3. Now, in addition to having the URL for this serial number, the serial number found on the "identity" card is also used to identify the user's company (the one assigned to this card) obviating the need for a username prompt at all. This serial number along with additional information embedded in the watermark on the card may be used to authenticate the user and personalize the registration process to that user. For example, the HTML interface presented to the user by the registration web site may be personalized for the user based on the embedded watermark information in the user's card or information linked to the embedded information. The registration web site may be personalized by showing the user status information for previous registration transactions, and batch embedding projects.

Additional information in the database 128 may be used to authenticate the user or personalize the registration process. For example, the database entry found by looking up the reference may include user information that identifies the user or his or her organization to the registration web site. This information may be re-directed directly to the registration web site or indirectly by passing it back to the user's computer, which then forwards it to the registration web site.

4. Once re-directed to the registration web site, the user enters the appropriate password to complete authentication and proceeds with the registration process.

Applications

There are a number of applications where many different identifiers need to be assigned to media objects, or different behaviors need to be assigned to the same or related media objects. One such application is where an entity would like to personalize the behavior associated with media objects. In particular, the customer seeking to embed large numbers of media objects would like to personalize the behavior associated with the media objects to particular individuals.

In the print media industry, one such example is to mark a page of a printed object, such as a phone directory, direct mail piece, magazine, etc., that includes a watermark with a behavior that is uniquely associated with an individual.

There are at least two different approaches to implement this functionality using the system described above. One approach is to assign different identifiers to each individual, and assign user specific behavior with each of these identifiers. For example, the embedding entity, such as a printer or publisher, could assign a different URL to fetch a different web page for each identifier. Another approach is to assign different identifiers to each individual, and include a unique index in the behavior description. In this second approach, the embedding entity could decide to associate the same URL with each of these identifiers, but then specify that the database forward the unique index in response to a decoding operation on the identifier. The web server at the specified URL to which the decoding client or registration database forwards a request then uses the unique index to perform a user-specific behavior, such as returning a user specific web page, or other content. In this second approach, the unique index enables the operator of the web server at the specified URL to determine which behaviors to associate with a particular index.

Here is how these two approaches operate:

1. An embedding entity requests many, many unique identifiers from the registration system for watermark embedding.

2. The embedding entity embeds these unique identifiers in each printed piece and distributes the watermarked objects.

3. The consumer uses a watermark decoder device (e.g., image watermark decoder software executing on a computer connected to an image capture device) to extract an identifier from individualized, watermarked object.

4. The watermark decoder reads the watermark, including the identifier, and forwards a request for the associated behavior (e.g., web address) to the registration database via an internet connection between the decoder and database management server.

5. The database management server looks up the individualized behavior (e.g., web address (complete or with a unique index attached)) and returns it to the decoder device.

6. The decoder device performs the behavior (e.g., redirects the user to the supplied web address (the address now has enough information to uniquely identify the user)). To redirect the user, the decoder device sends the address to a web server at the supplied address, which then looks up a corresponding user-specific web page using the address and returns the web page to the decoder device for rendering. As an alternative, the database management server may send the address directly to the web server, along with the IP address of the decoder device. The web server, in turn, forwards a user specific web page to the decoder device at the specified IP address.

The specific components involved in performing the behavior depend on the behavior and its implementation. The behavior may include launching a program on a server that interacts with a client module executing on the decoder device, such as an Internet browser that displays information from the server, an email client that sends an email via an email program on the server, and a media player that receives and renders media content (such as streaming audio or video) via a media object server.

7. The behavior is specific to the user because the identifier is associated with that user (e.g., the identifier is associated with a personalized web page that welcomes the user with user specific information).

While the above example is directed to watermarked printed objects, the approach applies to other watermarked objects, including both electronic objects like video, image and audio files, and physical objects, like packaging, stickers, documents, etc. In addition, it applies to different behaviors beyond web linking and re-direction, such as multimedia content streaming, email personalization, etc.

An additional specific example may help to further illustrate the methods described above. In this example, an operator of an interactive web site allows user to connect to the interactive web site via a client, such as an Internet browser through a web interface, and specify preferences to create personalized products or services. In particular, the web site enables the user to design a product or service of a particular type by specifying various attributes of that item. For example, the product may be a house, with attributes such as a particular architecture, color, layout, square footage, etc. The web site acts as a powerful sales and marketing tool to promote products or services tailored to the users' tastes. The web site forwards specific information provided by users to a printer's computer system over the Internet, instructing the printer to print direct mail pieces for each product designed by the users. In particular, the web site forwards information entered by each user, such as their name, address, product type, product attributes (size, color, model, etc.), product options packages, etc. in a text delimited file.

Using the batch registration database via an Internet connection, the printer computer system registers a unique watermark identifier for each of these files. As part of the registration process, the printer also includes a unique URL or unique index code in the behavior description so that the watermark identifier maps to a personalized web page, such as a web page illustrating the detailed information about the product and its attributes selected by the user.

The printer, through its computer system connected to the Internet, invokes the services of the batch registration and embedding system to create embedder control files and embed the images to be printed on the personalized direct mail pieces. The printer computer system automatically selects the images to be printed on each direct mail piece based on the selections included in the text delimited file from the web site. For example, a particular house style with certain option packages may be associated with one image of a house, while another house is associated with different images.

Once embedded with the watermarks carrying the appropriate unique identifier, the printer proceeds to print the direct mail pieces. Variable printing technology, such as variable offset printing, enables the printing of large batches of items, each with variable content. In the current example, variable offset printing is used to print direct mail pieces that includes images associated with the product type and option packages specified in the text delimited file created at the web site. After printing and mail delivery, the users that created product designs on the web site ultimately receive the direct mail pieces tailored to their product designs.

The direct mail pieces are watermark enabled. To connect to a personal web site related to the direct mail piece, the user shows the watermarked image to an image capture device connected to a computer running compatible watermark decoder software. The watermark decoder extracts the unique identifier, sends it to the database via an Internet connection, and receives a URL and possibly a unique index code in return. The decoder then redirects the URL and index code to the web server at the specified URL on the Internet. The web server then uses the URL and index code (if necessary) to look up and return a personalized web page to the user's computer.

This example extends to many types of products and services that a user might shop for via an interactive web site that enables the user to specify attributes of the product or service.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above, except Ser. No. 10/053,488.

The methods, processes, and systems described above may be implemented in hardware, software or a combination of hardware and software. For example, the watermark embedding and decoding processes may be implemented in a programmable computer or a special purpose digital circuit. Similarly, watermark decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method comprising:
   submitting a first registration file to a registration server, the first registration file comprising one or more requests to reserve one or more watermark identifiers, wherein the registration server generates the one or more reserved watermark identifiers;
   receiving the one or more reserved watermark identifiers from the registration server;
   submitting a behavior and a first reserved watermark identifier to the registration server, wherein the registration server associates the behavior with the first reserved watermark identifier;
   submitting a second registration file to the registration server, wherein the second registration file comprises the first reserved watermark identifier and an indication of a first media signal file, and wherein the registration server generates an embedded control file based on the second registration file;
   receiving the embedded control file from the registration server; and
   embedding, using a processor, the first reserved watermark identifier into the first media signal file, wherein the first reserved watermark identifier is embedded into the first media signal file based at least on the embedded control file, wherein the embedded control file comprises the first reserved watermark identifier, the indication of the first media file, and embedder control instructions, and wherein the embedder control instructions specify pixel blocks to encode the first watermark identifier.

2. The method of claim 1, wherein each of the one or more reserved watermark identifiers is a unique serial number.

3. The method of claim 1, wherein the one or more reserved watermark identifiers are stored in a registration database.

4. The method of claim 1, wherein embedding the first reserved watermark identifier into the first media signal file comprises:
   generating a second media signal file by embedding the first reserved watermark identifier into the first media signal file based on the embedder control instructions.

5. The method of claim 1, wherein embedding the first reserved watermark identifier into the first media signal file comprises:
   sending the embedded control file and the first media signal file to an embedding server, wherein the embedding server generates a second media signal file by embedding the first watermark identifier into the first media signal file based on the embedder control instructions; and
   receiving the second media signal file from the embedding server.

6. The method of claim 1, wherein the embedder control instructions embed one or more content type flags.

7. The method of claim 6, wherein the content type flags include content rating flags.

8. A system comprising:
   one or more processors configured to:
      submit a first registration file to a registration server, the first registration file comprising one or more requests to reserve one or more watermark identifiers, wherein the registration server generates the one or more reserved watermark identifiers;
      receive the one or more reserved watermark identifiers from the registration server;

submit a behavior and a first reserved watermark identifier to the registration server, wherein the registration server associates the behavior with the first reserved watermark identifier;

submit a second registration file to the registration server, wherein the second registration file comprises the first reserved watermark identifier and an indication of a first media signal file, and wherein the registration server generates an embedded control file based on the second registration file;

receive the embedded control file from the registration server; and embed the first reserved watermark identifier into the first media signal file, wherein the first reserved watermark identifier is embedded into the first media signal file based at least on the embedded control file, wherein the embedded control file comprises the first reserved watermark identifier, the indication of the first media file, and embedder control instructions, and wherein the embedder control instructions specify pixel blocks to encode the first watermark identifier.

9. The system of claim 8, wherein each of the one or more reserved watermark identifiers is a unique serial number.

10. The system of claim 8, wherein the one or more reserved watermark identifiers are stored in a registration database.

11. The system of claim 8, wherein to embed the first reserved watermark identifier into the first media signal file the one or more processors are configured to generate a second media signal file by embedding the first reserved watermark identifier into the first media signal file based on the embedder control instructions.

12. The system of claim 8, wherein to embed the first reserved watermark identifier into the first media signal file the one or more processors are configured to:

send the embedded control file and the first media signal file to an embedding server, wherein the embedding server generates a second media signal file by embedding the first watermark identifier into the first media signal file based on the embedder control instructions; and receive the second media signal file from the embedding server.

13. The system of claim 8, wherein the embedder control instructions embed one or more content type flags.

14. The system of claim 13, wherein the content type flags include content rating flags.

15. A non-transitory computer-readable medium having instructions stored thereon, the instructions comprising:

instructions to submit a first registration file to a registration server, the first registration file comprising one or more requests to reserve one or more watermark identifiers, wherein the registration server generates the one or more reserved watermark identifiers;

instructions to receive the one or more reserved watermark identifiers from the registration server;

instructions to submit a behavior and a first reserved watermark identifier to the registration server, wherein the registration server associates the behavior with the first reserved watermark identifier;

instructions to submit a second registration file to the registration server, wherein the second registration file comprises the first reserved watermark identifier and an indication of a first media signal file, and wherein the registration server generates an embedded control file based on the second registration file;

instructions to receive the embedded control file from the registration server; and instructions to embed the first reserved watermark identifier into the first media signal file, wherein the first reserved watermark identifier is embedded into the first media signal file based at least on the embedded control file, wherein the embedded control file comprises the first reserved watermark identifier, the indication of the first media file, and embedder control instructions, and wherein the embedder control instructions specify pixel blocks to encode the first watermark identifier.

16. The non-transitory computer-readable medium of claim 15, wherein each of the one or more reserved watermark identifiers is a unique serial number.

17. The non-transitory computer-readable medium of claim 15, wherein the one or more reserved watermark identifiers are stored in a registration database.

18. The non-transitory computer-readable medium of claim 15, wherein the instructions to embed the first reserved watermark identifier into the first media signal file further comprise:

instructions to generate a second media signal file by embedding the first reserved watermark identifier into the first media signal file based on the embedder control instructions.

19. The non-transitory computer-readable medium of claim 15, wherein the instructions to embed the first reserved watermark identifier into the first media signal file further comprise:

instructions to send the embedded control file and the first media signal file to an embedding server, wherein the embedding server generates a second media signal file by embedding the first watermark identifier into the first media signal file based on the embedder control instructions; and instructions to receive the second media signal file from the embedding server.

20. The non-transitory computer-readable medium of claim 15, wherein the embedder control instructions embed one or more content type flags.

* * * * *

UNITED STATES PATENT AND TRADEMARK OFFICE
CERTIFICATE OF CORRECTION

| | | |
|---|---|---|
| PATENT NO. | : 8,594,364 B2 | Page 1 of 1 |
| APPLICATION NO. | : 11/371374 | |
| DATED | : November 26, 2013 | |
| INVENTOR(S) | : Hein, III et al. | |

It is certified that error appears in the above-identified patent and that said Letters Patent is hereby corrected as shown below:

In the Claims:

In Column 11, Lines 29-30, in Claim 11, delete "file the" and insert -- file, the --, therefor.

In Column 11, Lines 35-36, in Claim 12, delete "file the" and insert -- file, the --, therefor.

Signed and Sealed this
Sixth Day of May, 2014

Michelle K. Lee
*Deputy Director of the United States Patent and Trademark Office*